(12) United States Patent
Pucci et al.

(10) Patent No.: US 11,806,914 B2
(45) Date of Patent: Nov. 7, 2023

(54) APPARATUS AND METHOD FOR FORMING A CONCAVE OBJECT

(71) Applicant: SACMI COOPERATIVA MECCANICI IMOLA SOCIETA' COOPERATIVA, Imola (IT)

(72) Inventors: Fabrizio Pucci, Bologna (IT); Fiorenzo Parrinello, Medicina (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 144 days.

(21) Appl. No.: 17/312,165

(22) PCT Filed: Dec. 10, 2019

(86) PCT No.: PCT/IB2019/060610
§ 371 (c)(1),
(2) Date: Jun. 9, 2021

(87) PCT Pub. No.: WO2020/121190
PCT Pub. Date: Jun. 18, 2020

(65) Prior Publication Data
US 2022/0016823 A1    Jan. 20, 2022

(30) Foreign Application Priority Data
Dec. 10, 2018    (IT) .................. 102018000010919

(51) Int. Cl.
*B29C 49/02*    (2006.01)
*B29B 11/12*    (2006.01)
(Continued)

(52) U.S. Cl.
CPC .............. *B29C 49/02* (2013.01); *B29B 11/12* (2013.01); *B29C 43/34* (2013.01); *B29C 43/36* (2013.01);
(Continued)

(58) Field of Classification Search
CPC ....... B29C 31/08; B29C 31/085; B29C 43/02; B29C 51/08; B29C 51/082; B29C 43/36;
(Continued)

(56) References Cited

U.S. PATENT DOCUMENTS 3,340,714 A * 9/1967 Pohl .................. B29C 51/14
29/445
3,642,415 A * 2/1972 Johnson ............. B29C 51/262
425/389
(Continued)

FOREIGN PATENT DOCUMENTS

AU    537180 B2    6/1984
CN    1173861 C    2/1998
(Continued)

OTHER PUBLICATIONS

English translation of Chinese Office action dated Nov. 2, 2023 in corresponding Chinese Patent Application No. or Publication No. 201980089203.3, 8 pages.
(Continued)

*Primary Examiner* — Monica A Huson
(74) *Attorney, Agent, or Firm* — Pearne & Gordon LLP; J. Gregory Chrisman

(57) ABSTRACT

A method comprises the following steps:
  providing a pre-processed element made of at least one polymeric material,
  introducing the pre-processed element in a female mould part having a forming cavity,
  shaping the pre-processed element between the female mould part and a male mould part, the female mould part and the male mould part being movable relative to one another along a moulding direction so as to form a concave object from the pre-processed element.
The forming cavity has a transversal dimension measured transversely relative to the moulding direction, the forming
(Continued)

cavity further having a transition zone in which the transversal dimension passes from a larger value to a smaller value, the forming cavity further having a bottom.

During the introducing step, the pre-processed element is placed on the transition zone, so that the pre-processed element rests on the transition zone at a distance from the bottom of the forming cavity.

19 Claims, 9 Drawing Sheets

(51) Int. Cl.
*B29C 43/34* (2006.01)
*B29C 43/36* (2006.01)
*B29C 49/08* (2006.01)
*B29C 49/22* (2006.01)
*B29K 105/00* (2006.01)
*B29L 31/00* (2006.01)

(52) U.S. Cl.
CPC .............. *B29C 49/08* (2013.01); *B29C 49/22* (2013.01); *B29C 49/0685* (2022.05); *B29C 2043/3411* (2013.01); *B29C 2043/3488* (2013.01); *B29C 2043/3602* (2013.01); *B29C 2949/0771* (2022.05); *B29C 2949/306* (2022.05); *B29C 2949/3016* (2022.05); *B29K 2105/253* (2013.01); *B29L 2031/716* (2013.01)

(58) Field of Classification Search
CPC ......... B29C 43/34; B29C 49/22; B29C 49/08; B29C 49/02; B29C 2949/3008; B29C 2949/0771; B29C 2949/3016; B29C 49/0685; B29C 2043/3411; B29C 2043/563; B29C 2043/3472; B29C 2043/3602; B29C 2949/22; B29C 2949/306; B29C 2043/3488; B29C 2043/561; B29B 11/12; B29L 2031/716; B29K 2105/253
See application file for complete search history.

(56) References Cited

U.S. PATENT DOCUMENTS

| | | |
|---|---|---|
| 6,018,072 A | 1/2000 | Nishihira |
| 6,083,449 A | 7/2000 | Rees |
| 6,349,838 B1 | 2/2002 | Saito et al. |
| 8,702,415 B2 | 4/2014 | Monzen |
| 2002/0088767 A1 | 7/2002 | Saito et al. |
| 2010/0129577 A1 | 5/2010 | Sasai |
| 2010/0189832 A1 | 7/2010 | Monzen et al. |
| 2010/0209727 A1 | 8/2010 | Monzen |
| 2017/0121121 A1 | 5/2017 | Takeda |
| 2018/0297246 A1 | 10/2018 | Pucci et al. |

FOREIGN PATENT DOCUMENTS

| | | |
|---|---|---|
| CN | 101801633 A | 8/2010 |
| CN | 106217730 A | 12/2016 |
| DE | 10235845 A1 | 2/2004 |
| JP | 2000238734 A | 9/2000 |
| JP | 2006346989 A | 12/2006 |
| JP | 2009073095 A | 4/2009 |
| JP | 2009226766 A | 10/2009 |
| JP | 2018530462 A | 10/2018 |
| JP | 2018171876 A | 11/2018 |
| KR | 101294134 B1 | 8/2013 |
| WO | 2005/058572 A1 | 6/2005 |
| WO | 2015/122412 A1 | 3/2017 |
| WO | 2017/064601 A1 | 4/2017 |

OTHER PUBLICATIONS

Japanese Office action dated Aug. 2, 2022 in corresponding Japanese Patent Application No. 2021-532891, with English translation, 10 pages.
Japanese Office action dated May 23, 2023 in corresponding Japanese Patent Application No. 2021-532891, 5 pages.
Taiwanese Office Action dated May 5, 2023 in corresponding Taiwanese Patent Application, 20 pages.

* cited by examiner

APPARATUS AND METHOD FOR FORMING A CONCAVE OBJECT

The invention relates to a method and an apparatus for forming a concave object, particularly by compression moulding.

The concave object which can be obtained by means of the method and apparatus according to the invention may be a preform suitable for being subjected to a process of blow moulding or stretch blow moulding in order to obtain a container, such as a bottle. Alternatively, the concave object which can be obtained by means of the method and apparatus according to the invention may be a container, for example a jar, a cup or the like.

The method and the apparatus according to the invention allow a concave object to be obtained starting from a pre-processed element made of at least one polymeric material, for example a dose severed from a polymeric flow coming out from an extruder. The pre-processed element can have a multilayer or single layer structure.

Machines are known for compression moulding preforms, comprising a mould provided with a female mould part having a forming cavity and a male mould part cooperating with the female mould part. The known machines further comprise an extruder and a transport device, for transporting doses of polymeric material severed from the extruder towards the female mould part. In the known machines, the dose of polymeric material is deposited on the bottom of the forming cavity and then shaped between the female mould part and the male mould part.

The known machines are able to produce preforms of good quality and with a high productivity. However, these machines can be improved, in particular as regards the manner of inserting the dose in the forming cavity of the female mould part.

In order to reach the bottom of the forming cavity, the dose must have transversal dimensions smaller than the transversal dimensions of the forming cavity. Usually, the forming cavity has transversal dimensions, in particular a diameter, which are relatively small. If this is the case, the dose generally has transversal dimensions which are only slightly smaller than the diameter of the forming cavity.

In this situation, it is possible that the dose, while falling into the forming cavity, is arranged in a non-centered position relative to a longitudinal axis of the forming cavity. In this case, the dose may adhere to a cylindrical lateral wall that delimits the forming cavity, which prevents the dose from reaching the bottom of the forming cavity. Consequently, defects can be generated on the preform, due to a non-uniform filling of the mould by the polymeric material forming the dose. In the most serious cases, it is even possible that the mould does not close because the dose protrudes partly outside of the forming cavity.

In the known machines described above, the dose is shaped as a cylinder having a height slightly smaller than a longitudinal dimension of the forming cavity. Due to its considerable height, the dose needs a relatively long time to be deposited in the forming cavity and to reach the bottom of such cavity.

US 2018/297246 discloses a compression moulding apparatus, in which the doses are positioned on the bottom of the mould cavity.

DE 10235845 discloses a compression moulding apparatus, in which each dose is positioned on a flat surface which delimits a step provided in the moulding cavity.

An object of the invention is to improve the methods and the apparatuses for forming a concave object, starting from a pre-processed element, for example a dose, made of at least one polymeric material.

A further object is to improve the positioning of the pre-processed element inside the female mould part.

Another object is to allow the pre-processed element o be positioned in a more precise manner inside a forming cavity with respect to the prior art.

A still further object is to reduce the defects originated on the formed object due to a non-uniform filling of the mould by the polymeric material.

Another object is to reduce the time necessary for positioning a pre-processed element, for example a dose, in a forming cavity of a female mould part.

In a first aspect of the invention, there is provided a method comprising the following steps:
  providing a pre-processed element made of at least one polymeric material,
  introducing the pre-processed element in a female mould part having a forming cavity,
  shaping the pre-processed element between the female mould part and a male mould part, the female mould part and the male mould part being movable relative to one another along a moulding direction so as to form a concave object from the pre-processed element,
wherein the forming cavity has a transversal dimension measured transversely to the moulding direction, the forming cavity further having a transition zone in which said transversal dimension passes from a larger value to a smaller value, the forming cavity further having a bottom,
and wherein, during the introducing step, the pre-processed element is placed on the transition zone, so that the pre-processed element rests on the transition zone in a position spaced apart from the bottom of the forming cavity.

Owing to this aspect of the invention, it is possible to improve the positioning of the pre-processed element inside the female mould part. Placing the pre-processed element on the transition zone makes it possible to considerably increase the stability of positioning of the pre-processed element in the female mould part, thereby reducing the risks that the pre-processed element is arranged in an undesired position after being released in the forming cavity.

In particular, the pre-processed element may rest on the transition zone along an entire peripheral region of the pre-processed element. This guarantees a high stability in positioning the pre-processed element Moreover, the transition zone guides the pre-processed element while the latter moves downwards, towards the bottom of the forming cavity. This increases further the positioning precision of the pre-processed element in the forming cavity. In particular, the risks are reduced that the pre-processed element is placed in an off-centre position inside the forming cavity.

The method according to the first aspect of the invention also makes it possible to reduce the time necessary for positioning the pre-processed element inside the forming cavity. Indeed, the pre-processed element is introduced in the female mould part simply by resting the pre-processed element on the transition zone, without waiting for the pre-processed element to move downwards until reaching the bottom of the forming cavity. This speeds up introduction of the pre-processed element in the female mould part.

In an embodiment, the transition zone is a funnel-shaped surface.

The funnel-shaped surface defines a relatively large resting zone on which the pre-processed element rests when it reaches the female mould part. This prevents the pre-processed element from becoming wrinkled or being placed in an undesired position.

In an embodiment, the pre-processed element, after being positioned on the transition zone and before starting to interact with the male mould part, is deformed at least in a central zone thereof due to the force of gravity, thereby taking a concave shape with a concavity facing upwards.

Thus, a sort of pre-forming of the pre-processed element occurs, due to the force of gravity, which prepares the pre-processed element to be subsequently shaped by the male mould part.

In an embodiment, a forming chamber is defined between the female mould part and the male mould part.

The forming chamber is closed before the pre-processed element contacts the bottom of the forming cavity.

Closing the forming chamber at an early step, in which the pre-processed element has not yet contacted the bottom of the forming cavity, prevents the pre-processed element from flowing out of the forming chamber, due to deformations which occur when the pre-processed element starts to interact with the male mould part. If the pre-processed element flowed out of the forming chamber, it would be impossible to correctly close the mould. In an embodiment, air is discharged from a zone of the forming cavity arranged below the pre-processed element during the step of shaping the pre-processed element.

This makes it possible to remove the air present in the forming cavity below the pre-processed element. Indeed, the pre-processed element, which rests on the transition zone for an extension of 360° about an axis of the forming cavity, closes nearly hermetically the underlying zone of the forming cavity, thereby making it difficult—if not impossible—to remove from above the air present in the zone of the forming cavity arranged below the pre-processed element.

In an embodiment, the pre-processed element is a dose of molten polymeric material severed from an extrudate at the outlet of an extruder.

The dose may be made with a single polymeric material, in which case the dose has a single layer structure.

In an alternative embodiment, the dose may have a multilayer structure, particularly comprising at least two layers of polymeric materials different from each other.

The male mould part and the female mould part can be conformed for shaping the concave object from the dose by compression moulding. In a second aspect of the invention, there is provided an apparatus comprising:
  a feeding device for providing a pre-processed element made of at least one polymeric material,
  at least one mould comprising a female mould part and a male mould part, movable relative to one another along a moulding direction in order to form a concave object from the pre-processed element, the female mould part having a forming cavity;
  a transport device for transporting the pre-processed element towards the mould and releasing the pre-processed element into the forming cavity;
wherein the forming cavity has a bottom and a lateral region, the lateral region having a transition zone in which a transversal dimension of the forming cavity passes from a larger value to a smaller value, the transition zone being spaced apart from the bottom and being configured to restingly receive the pre-processed element when the pre-processed element is released in the forming cavity by the transport device.

Owing to the second aspect of the invention, it is possible to obtain the advantages described above with reference to the first aspect of the invention, particularly with regard to the precision and the stability in positioning the pre-processed element inside the forming cavity.

In a third aspect of the invention, there is provided a method comprising the following steps:
  providing a pre-processed element made of at least one polymeric material,
  introducing the pre-processed element in a female mould part having a forming cavity,
  shaping the pre-processed element between the female mould part and a male mould part, the female mould part and the male mould part being movable relative to one another along a moulding direction so as to form a concave object from the pre-processed element,
wherein the forming cavity has a transversal dimension measured transversely to the moulding direction, the forming cavity further having a transition zone defined by a funnel-shaped surface in which said transversal dimension progressively decreases from a larger value to a smaller value, the forming cavity further having a bottom,
and wherein, during the introducing step, the pre-processed element is placed in the forming cavity on the transition zone, so that the pre-processed element rests on the funnel-shaped surface in a position spaced apart from the bottom of the forming cavity.

The method according to the third aspect of the invention makes possible to obtain the advantages which were previously described with reference to the first aspect of the invention.

By placing the pre-processed element in the forming cavity at a distance from the bottom of the forming cavity, it is furthermore avoided that the pre-processed element contacts the bottom of the forming cavity prematurely. It is thus avoided that, on a bottom wall of the concave object that is being formed, a spot is generated having an appearance and/or properties different from those of the surrounding zones. This spot would be due to the premature cooling that would occur if the pre-processed element rested on the bottom of the forming cavity before contacting other zones of the forming cavity. It is stressed that the bottom wall of the formed object can be a critical zone, particularly for certain kind of objects such as preforms, which have to be subjected to blow moulding or stretch blow moulding. It is therefore important that such zone be free of defects as much as possible.

The funnel-shaped surface has a transversal dimension which decreases progressively, i.e. without steps, from a larger value to a smaller value.

By resting the pre-processed element on the funnel-shaped surface, it is easier to guide the pre-processed element towards the bottom of the forming cavity and centering the pre-processed element in the forming cavity. The risk that the pre-processed element is positioned non-correctly in the forming cavity, which would jeopardize subsequent forming thereof, is therefore reduced.

The invention can be better understood and carried out with reference to the accompanying drawings which illustrate a non-limiting embodiment thereof and in which.

Figure 1:
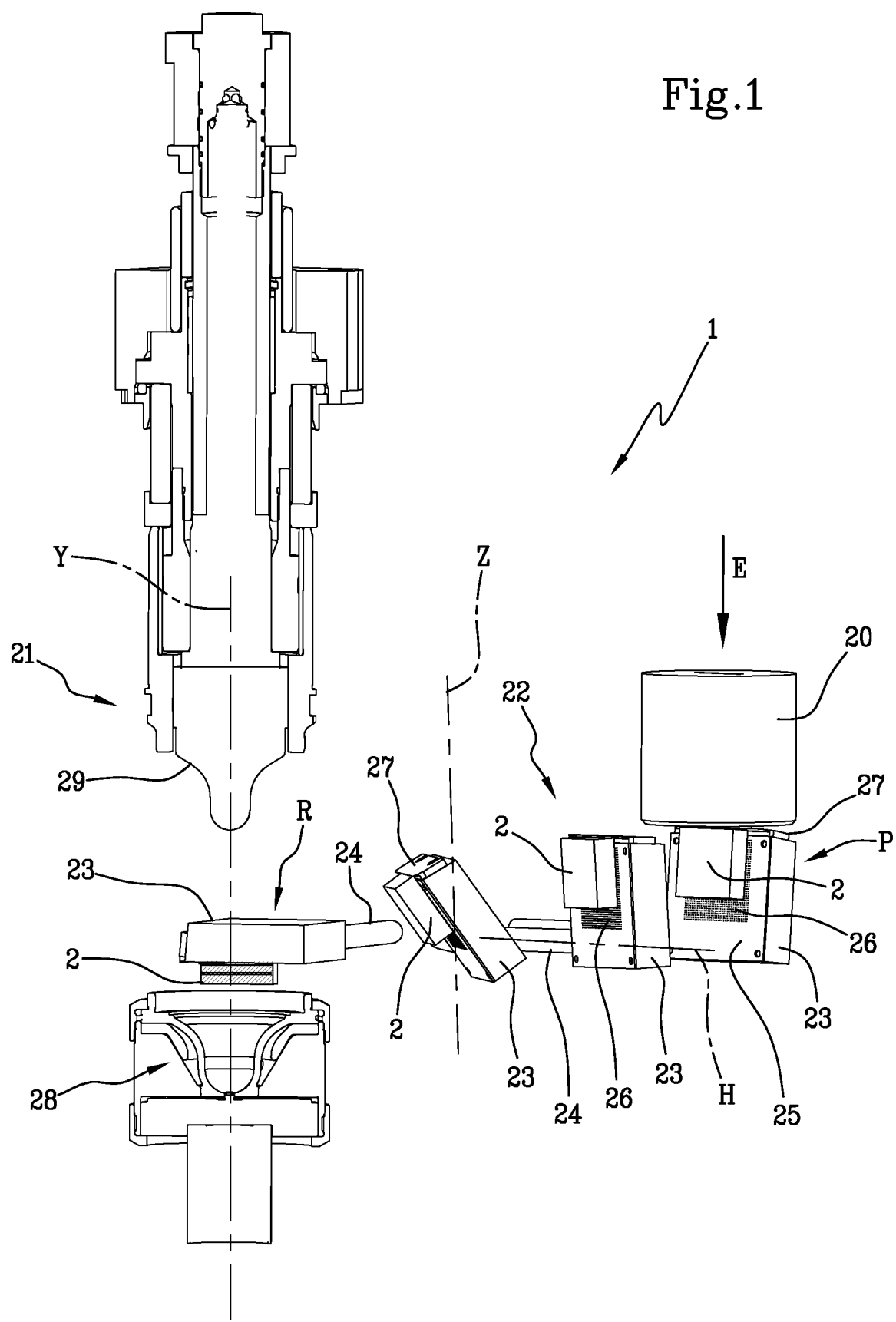
FIG. 1 is a perspective view, with some parts in cross section, schematically showing an apparatus for producing a concave object.

FIG. 1 shows an apparatus 1 for producing objects made of polymeric material, particularly by compression moulding. The objects which the apparatus 1 allows to produce may be concave objects, particularly preforms for containers, that is to say, preforms intended to be transformed into containers by blow moulding or stretch blow moulding. However, the apparatus 1 may also be used for producing other types of concave objects, in particular containers such as, for example, jars or cups.

Figure 2:
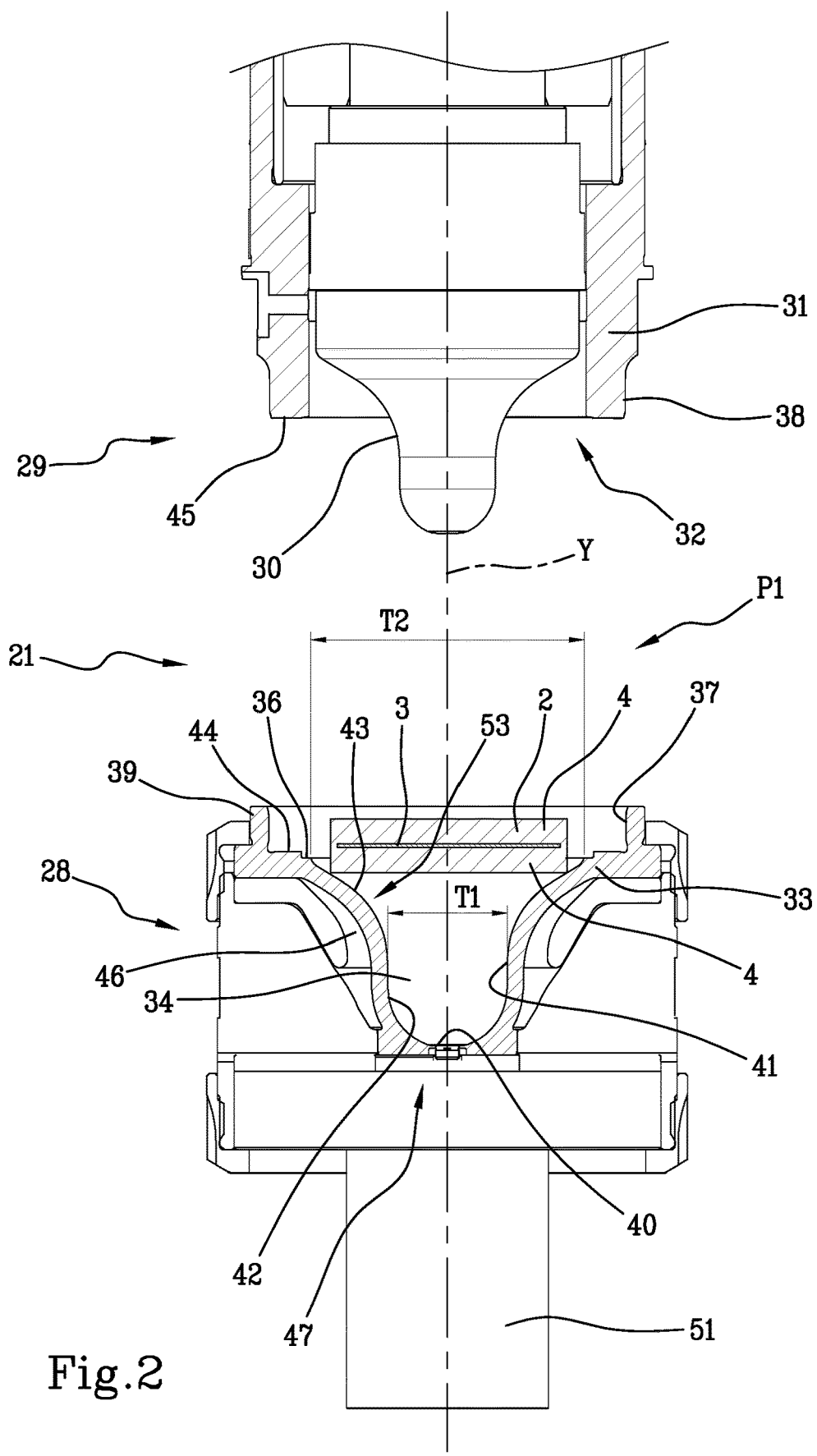
FIG. 2 is a cross section, enlarged and interrupted, showing a mould of the apparatus of FIG. 1, in a maximum opening configuration.

The apparatus 1 allows a concave object to be obtained starting from a pre-processed element made of at least one polymeric material. In the example shown, the pre-processed element is a dose 2 of polymeric material, intended to be subjected to compression moulding in order to obtain a concave object. As better shown in FIG. 2, the dose 2 may have a multilayer structure, that is to say, it may comprise a plurality of layers of polymeric materials. In the example of FIG. 2, three layers of polymeric material are provided, namely a functional central layer 3, interposed between two outer layers 4. The central layer 3 may comprise a material having barrier properties, for example to gases and/or oxygen and/or light. The outer layers 4, which may be equal or different from each other, can be made of materials intended to give the desired mechanical and/or aesthetic properties to the objects which will be obtained. Respective auxiliary layers can be interposed between the outer layers 4 and the central layer 3, for example, a layer of compatibilization material having the purpose of improving adhesion between the central layer and the outer layers.

The central layer 3 may be embedded between the outer layers 4, as in the example of FIG. 2, in which the central layer 3 does not appear on the outer faces of the does 2.

In an alternative embodiment not illustrated, the central layer 3 may, on the other hand, appear outside of the dose 2, that is to say, extend up to the lateral walls of the dose 2.

In the example shown, the dose 2 has a parallelepiped conformation, that is to say, it is shaped like a parallelepiped which may have a square or rectangular base.

If present, the central layer 3, which has a substantially flat shape, lies on a plane parallel to the base of the parallelepiped.

In the example shown in FIG. 2, the dose 2 is shaped like a parallelepiped having a height, i.e. a thickness, much smaller than the linear dimensions of the base. However, this condition is not necessary, and the dose 2 might also be shaped like a parallelepiped having a height slightly less than, approximately equal, or even greater, than the linear dimensions of the base. The shape of a parallelepiped is particularly easy to be obtained, simply by cutting the dose 2 from an extruded structure, having a rectangular or square cross-section.

However, it is theoretically also possible to use doses having a shape different from a parallelepiped.

Figure 8:
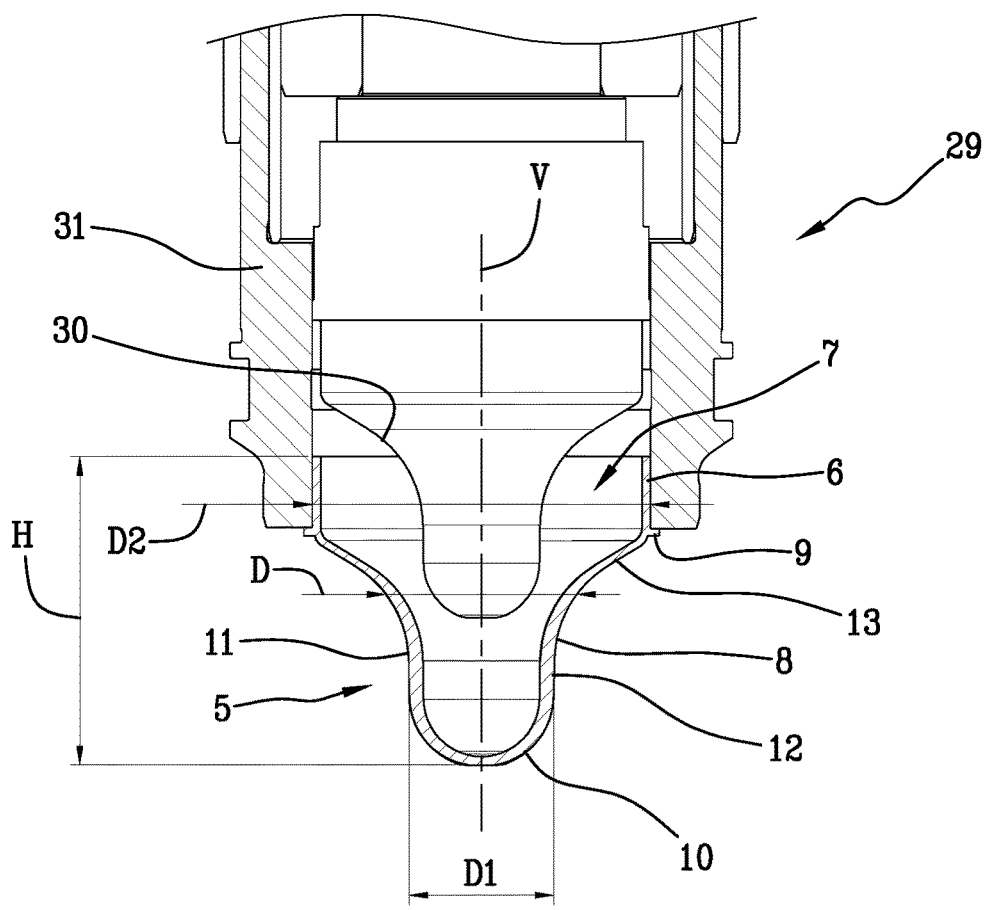
FIG. 8 is a view like that of FIG. 2, showing the mould at the end of a forming step.
Figure 8:
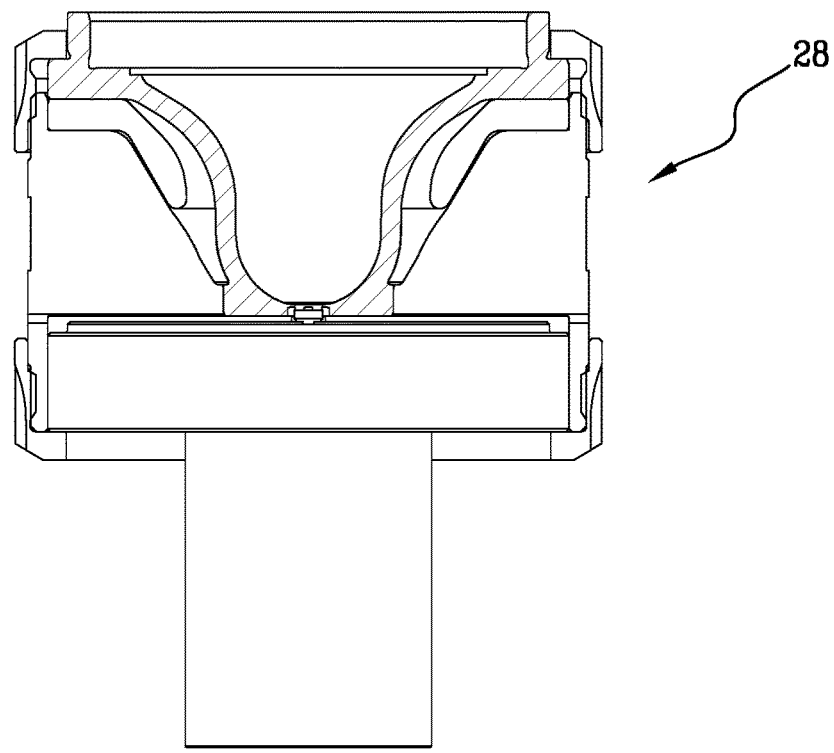

FIG. 8 shows an example of an object 5 which can be obtained from the dose 2 by compression moulding.

In the example shown, the object 5 is a preform suitable for being subjected to blow moulding or stretch blow moulding to obtain a container.

The container which can be obtained from the preform is in this case a so-called "spoonable" container, i.e. a container so conformed that it is possible to pick up its contents using a spoon. For this reason, the container has a wide open top end, or mouth, through which a spoon filled with the contents of the container can pass. A typical example of this type of container is a yogurt pot. The preform which can be obtained by the apparatus 1 has, as shown in FIG. 8, a neck 6 suitable for forming a mouth of the container which can be obtained from the preform. The neck 6 may have a substantially cylindrical shape, even though other geometries are in principle possible. For example, the neck 6 may be provided with an upper flange, or with retaining elements suitable for engaging with a closure element of the container, such as cams or thread portions.

In any case, the neck 6 surrounds an opening 7 by means of which, in the finished container, it will be possible to access the contents. In the finished container, the opening 7 is intended to be closed by a closure element such as a heat-sealable lid, a threaded lid, a lid provided with internal cams or other. The neck 6 may have a geometry which will not change during the subsequent blow moulding or stretch blow moulding process by means of which the container will be obtained from the preform.

Below the neck 6, i.e. on the opposite side of the neck 6 relative to the opening 7, the object 5 comprises a body 8. If the object 5 is a preform, the body 8 is intended to be deformed during the subsequent blow moulding or stretch blow moulding process, in order to obtain from the preform the desired container. Between the body 8 and the neck 6 an annular protrusion 9 may be provided, the annular protrusion 9 projecting towards the outside of the object 5. The annular protrusion 9 may be, for example, used for transporting the object 5 during the subsequent processing steps to which the object is subjected.

The body 8 comprises a bottom wall 10, which in the example shown is shaped like an overturned dome, opposite the opening 7. The body 8 further comprises a lateral wall 11, interposed between the bottom wall 10 and the neck 6, in particular between the bottom wall 10 and the annular protrusion 9. The body 8 may extend about an axis V.

The lateral wall 11 may have an intermediate region 12 having a dimension D1, measured transversely to the axis V, less than a transversal dimension D2 of the neck 6. If the intermediate region 12 and/or the neck 6 have a circular transversal cross section, the dimensions D1 and D2 coincide with an external diameter of the intermediate region 12 and respectively of the neck 6. However, the intermediate region 12 and/or the neck 6 might also have a non-circular transversal cross section, in which case the dimensions D1 and D2 are transversal dimensions considered transversely, in particular perpendicularly, to the axis V.

In the example shown, the dimensions D1 and D2 are taken at respective cylindrical portions, i.e. at portions having a constant transversal cross-section along the axis V, of the intermediate region 12 and of the neck 6. However, the intermediate region 12 and/or the neck 6 might have a transversal cross-section variable along the axis V, in which case the dimensions D1 and D2 may be average transversal dimensions.

The body 8, or more specifically, the lateral wall 11, may comprise a transition region 13 for passing from the transversal dimension D2 to the transversal dimension D1. The transition region 13 is, in the example illustrated, interposed between the neck 6 and the intermediate region 12, more specifically interposed between the annular protrusion 9 and the intermediate region 12. The transition region 13 has a transversal dimension D which decreases progressively moving from the opening 7 towards the bottom wall 10, with a trend which may be linear (in which case the transition region 13 has a frustum-conical shape) or non-linear (in which case the transition region 13 has a non frustum-conical shape, for example it is bulging towards the inside or towards the outside).

The ratio between the transversal dimension D2 of the neck 6 and the transversal dimension D1 of the intermediate region 12 is generally greater than 1. By way of example, this ratio can be equal to 1.1, or 1.2, or greater than these values.

The object 5 has a height H (i.e. a total dimension), measured along the axis V which, in the example illustrated, is approximately equal to the transversal dimension D2 of the neck 6.

The height H may however be greater than the transversal dimension D2 of the neck 6, or even smaller than the transversal dimension D2 of the neck 6.

By way of example, the ratio between the height H and the transversal dimension D2 of the neck 6 may be greater than 0.4.

The apparatus 1 comprises a feeding device for providing a pre-processed element made of at least one polymeric material, the pre-processed element being intended to be subsequently shaped for forming the object 5.

In the example shown, in which the pre-processed element is a dose 2, the feeding device comprises, as shown in FIG. 1, a dispensing device 20 for dispensing at least one polymeric material More specifically, the dispensing device 20 is a plasticizing device which plasticizes one or more polymeric materials to obtain a dose 2 in the molten state.

The dispensing device 20 can comprise a co-extrusion device for dispensing a continuous co-extruded structure comprising a plurality of layers of polymeric materials different from each other. In this case, as described in more detail below, a dose 2 of the type shown in FIG. 2, having a multi-layer shape, will be obtained by cutting the continuous co-extruded structure.

In an alternative embodiment, the dispensing device 20 may comprise an extrusion device arranged for extruding a single material continuous structure, that is to say, a continuous structure made with a single polymeric material instead of a plurality of polymeric materials different to each other. In this case, cutting the continuous structure coming out from the dispensing device 20 obtains a single material dose 2.

The dispensing device 20 is provided with an outlet opening having a rectangular or square shape, so as to dispense a continuous structure shaped like a strip having a cross-section which is rectangular or square. If the transversal cross section of the strip is rectangular, the base of the rectangle may be much greater than the height, even if this condition is not necessary. Any functional layer of material, intended to form the central layer 3 in the dose 2, may extend continuously or intermittently inside the continuous structure coming out from the dispensing device 20.

In the example shown, as can be seen in FIG. 2, the outlet opening of the dispensing device 20 faces downwards. The dispensing device 20 is configured for dispensing a continuous structure downwards, along a outlet direction E which is vertical or substantially vertical. However, this condition is not necessary.

The apparatus 1 further comprises a moulding device provided with at least one mould 21, shown in FIG. 1.

The mould 21 may be included in a plurality of moulds not shown, mounted in a peripheral region of a moulding carousel. The moulding carousel is rotatable about a respective axis, for example positioned vertically.

Alternatively, the mould 21 may be included in a plurality of moulds not shown, positioned according to a linear arrangement.

In any case, the mould 21 is configured for shaping a dose 2 made of polymeric material, in such a way as to obtain the object 5 by compression moulding.

Between the dispensing device 20 and the mould 21 a transport device 22 may be interposed, the transport device 22 being in particular shaped like a transport carousel The transport device 22 comprises a plurality of transport elements 23, each of which is arranged for transporting, towards a mould 21, a dose 2 of polymeric material which has been severed from the polymeric material coming out from the dispensing device 20. The example illustrated shows four transport elements 23 for simplicity of representation, but a different number of transport elements 23 can be provided, the transport elements 23 being distributed regularly about an axis Z, extending in particular along a vertical direction.

The transport device 22 may comprise a central body, not illustrated, rotatable about the axis Z owing to a motor device, also not shown.

The transport elements 23 may be supported by the central body.

When the central body rotates about the axis Z, the transport elements 23 move along a path directed from the dispensing device 20 towards the mould 21, so as to bring the dose 2 to the mould 21. This movement defines a first movement of the transport elements 23. In the example shown, the path which the transport elements 23 follow during the first movement is a closed path, in particular a circular path about the axis Z. In an alternative embodiment not illustrated, the path of the transport elements 23 directed from the dispensing device 20 towards the mould 21 could be a closed non-circular path, or a non-closed path, for example linear.

The closed non-circular path is particularly suitable if the path of a transport element 23 is to overlap that of the mould 21 not only at one point, but in a portion of greater length. This allows the transport element 23 to remain superposed on a part of the mould 21 (more precisely, on a female mould part, as described in more detail below), for a sufficiently long time to ensure that the dose 2 is released in the mould 21 without positioning defects.

Each transport element 23 is also configured to perform, in addition to the first movement and during the first movement, a second movement by rotating about an axis, of the transport element 23 itself, which is denoted by H in FIG. 1 and shown for a single transport element 23. This second movement makes it possible to modify the orientation of the dose 2, as described in more detail below.

In order to perform the second movement, in the example shown, each transport element 23 is fixed to an arm 24, which extends along the respective axis H.

Each axis H is positioned transversely, in particular perpendicularly, relative to the axis Z. The axes H may lie in a single plane and be, for example, arranged radially around the axis Z.

Each transport element 23 is delimited by a transport surface 25 suitable for coming into contact with the dose 2 for transporting the dose 2 to the mould 21.

In the example shown the transport surface 25 is flat. This shape of the transport surface 25 is particularly suitable for transporting doses 2 having a parallelepiped shape, as shown in FIG. 1. The transport surface 25 may however also have shapes which are not flat, particularly if the dose 2 is not parallelepiped in shape. In general, the transport surface 25 has a shape which matches the shape of the portion of dose intended to come into contact with the transport surface 25.

To guarantee stability in the transport of the dose 2 and prevent undesired deformations of the dose 2, the transport surface 25 has an area greater than the area of the face the dose 2 intended to come into contact with the transport surface 25.

The transport element 23 may be provided with a suction device, which can be activated selectively to retain the dose 2 in contact with the transport surface 25 during transport. The suction device may comprise a plurality of holes 26, formed on the transport surface 25 and communicating with a suction source, so that the does 2 can be kept adherent to the transport surface 25.

The transport element 23 may also be provided with a blowing device which can be activated selectively to make easier the detachment of the dose 2 from the transport surface 25, so that the dose 2 can be delivered to the mould 21. The blowing device may comprise a source of compressed air for dispensing a flow of compressed air on the dose 2, particularly through the holes 26.

In an embodiment not illustrated, instead of the blowing device or in combination with the latter, the transport element 23 may be provided with a sort of piston, that is to say, a mechanical element which, at the suitable moment, pushes the dose 2 downwards, helping the dose 2 to detach from the transport surface 25 to be released in the mould 21.

The transport element 23 may be provided with a thermal conditioning device, in particular designed like a heating device, so as to prevent excessive cooling the dose 2 during transport. Alternatively, the thermal conditioning device may be designed like a cooling device to prevent an excessive adhesion of the dose 2 to the transport element 23, if the transport element 23 tends to overheat.

Each transport element 23 is associated with a movement device (not illustrated), which may be, for example, housed in the central body of the transport device 22, for rotating the transport element 23 about the respective axis H, so that the transport element 23 can perform the second movement.

In a region of its path about the axis Z, the transport element 23 passes close to the dispensing device 20, in particular below the outlet opening of the dispensing device 20, from which the continuous structure of polymeric material, still in the molten state, flows out.

Upstream of the dispensing device 20, the transport element 23 rotates about the respective axis H positioning itself in a picking up configuration P, shown in FIG. 1, in which the transport element 23 picks up a dose 2 severed from the outlet opening of the dispensing device 20. In the picking up configuration P, the transport surface 25 may be directed vertically, or slightly backwards relative to the vertical direction.

In this way, the dose 2, which exits from the dispensing device 20 along the substantially vertical outlet direction E rests on the transport surface 25, which is also located substantially vertically, adhering consequently to the transport surface 25 owing to the viscosity of the polymeric material.

More generally speaking, in the picking up configuration P, the transport element 23 is positioned in such a way that the transport surface 25 (or an axis thereof, if the transport surface 25 is shaped like a cylinder portion) is substantially parallel to the outlet direction E of the dose 2 from the dispensing device 20.

The dose 2 is received from the transport element 23 in the picking up configuration P, while the dose 2 has a first orientation which in the example illustrated is substantially vertical. In an alternative embodiment, the dose 2 might have, in the picking up configuration P, a non-vertical orientation, for example because the outlet direction E is not vertical.

After receiving the dose 2 in the picking up configuration P, whilst the transport element 23 is moved about the axis Z (first movement), the transport element 23 continues to rotate about the corresponding axis H (second movement). The transport element 23 rotates about the axis H until reaching a release configuration R, shown in FIG. 1, in which the dose 2 is released inside the mould 21, as described in more detail below. In the release configuration R, the transport surface 25 is facing downwards and may be, in particular, substantially horizontal.

In the release configuration R, the dose 2 has a second orientation which makes it suitable to be released in the mould 21.

After having released the dose 2 in the mould 21, the transport element 23 may remain in the release configuration R, that is to say, with the transport surface 25 facing downwards, until the transport element 23 returns close to the outlet opening of the dispensing device 20, and upstream of the latter.

The apparatus 1 further comprises at least one separating element for severing the doses 2 from the dispensing device 20.

In the example shown, there is a plurality of separating elements 27, each separating element 27 being associated with a transport element 23, in particular supported by the transport element 23. For example, each separating element 27 may be shaped like a cutting member positioned along an edge of the transport surface 25.

When the separating element 27 passes beneath the outlet opening of the dispensing device 20, the separating element 27 cuts a dose 2, particular by scraping it from the outlet opening. The dose 2 remains adhered to the transport element 23, particularly to the transport surface 25, so as to be transported towards the mould 21.

The separating elements 27 may be conformed differently to what shown. For example, each separating element 27 might be made integrally with the corresponding transport element 23.

It is also possible to provide a separating element 27 independent of the transport elements 23, in particular a separating element positioned upstream of the transport elements 23 and distinct from the latter, for example a blade which rotates in a position interposed between the dispensing device 20 and the transport elements 23, or a laser beam.

If the outlet opening has a rectangular or square shape, the dose 2 severed from the continuous structure coming out from the dispensing device 20 has a parallelepiped shape. In this case, a face of the parallelepiped, for example the face having the largest area with respect to the other faces, adheres to the transport surface 25 during transport of the dose 2 towards the mould 21.

If the dose 2 has a multi-layer conformation as in the example shown, whilst the dose 2 is transported by the transport element 23, the central layer 3 of the dose 2 lies in a plane parallel to the transport surface 25.

As shown more clearly in FIG. 2, the mould 21 comprises a female mould part 28 and a male mould part 29, suitable for acting in conjunction with each other to form the object 5 from the dose 2.

The female mould part 28 and the male mould part 29 are aligned with each other along a moulding axis Y, which may be vertical.

The female mould part 28 is positioned beneath the male mould part 29.

The male mould part 29 may comprise a punch 30, which may extend mainly along the axis Y and is arranged for shaping an inner surface of the object 5.

An extractor element 31 can be associated with the punch 30, the extractor element 31 being particularly shaped like a tubular element, which extends about the moulding axis Y and surrounds at least partly the punch 30. More specifically, a lower portion of the punch 30 protrudes from a lower end of the extractor element 31.

The extractor element 31 is conformed to engage with a portion of the object 5, in particular with the annular protrusion 9, so as to push on this portion for helping the object 5 to detach from the punch 30, after the object 5 has been formed. For this purpose, a system of springs, not illustrated in detail, may act on the extractor element 31.

The extractor element 31 may also contribute to shaping the dose 2 to obtain the object 5. More specifically, the extractor element 31 may be delimited by a forming end 32 intended to shape an upper surface of the annular protrusion 9 and an outer surface of the neck 6.

The female mould part 28 may comprise a female mould element 33 inside of which a forming cavity 34 is defined, the forming cavity 34 being arranged for shaping the outside of the body 8 of the object 5. The forming cavity 34 is further arranged for shaping a lower surface and a lateral surface of the annular projection 9.

The forming cavity 34 has a bottom 40, configured for shaping the outside of the bottom wall 10 of the object 5. The bottom 40 is delimited by a surface which extends transversely to the moulding axis Y.

The bottom 40 may have a concave shape with concavity facing towards the inside of the forming cavity 34, for example a shape like an inverted dome. The forming cavity 34 also has a lateral region 41, configured for shaping the outside of the lateral wall 11 of the object 5. The lateral region 41 is delimited by a surface which extends about the moulding axis Y. The lateral region 41 is positioned above the bottom region 5.

At an upper end of the forming cavity 34, the female mould element 33 may have an annular forming surface 36 for shaping a lower surface of the annular projection 9.

The female mould element 33 may have, in an upper region thereof, a centring surface 37 suitable for engaging, in a shapingly coupled manner, with a further centring surface 38 of the extractor element 31. More specifically, the centring surface 37 delimits internally a protuberance 39, which projects upwards from the female mould element 33. A lower end of the extractor element 31, delimited by the further centring surface 38, is suitable for being received inside the protuberance 39 so as to engage with the centring surface 37. Thus, the female mould part 28 and the male mould part 29 may move towards each other in a guided and centred manner.

The female mould element 33 also has, in a position interposed between the protuberance 39 and the annular forming surface 36, an abutment surface 44, suitable for abutting against a contact surface 45 of the extractor element 31, as described in more detail below.

The female mould part 28 and the male mould part 29 are movable relative to one another along a moulding direction, which may be parallel to the moulding axis Y.

The lateral region 41 of the forming cavity 34 has a transition zone 53, in which a transversal dimension of the forming cavity passes from a larger value T2 to a smaller value T1, moving towards the bottom 40. The transversal dimension is measured transversely, in particular perpendicularly, relative to the moulding direction. If the forming cavity 34 has a circular cross-section, taken in a plane perpendicular to the moulding direction, the transversal dimension of the forming cavity is a diameter of the circular cross-section. If the forming cavity has a non-circular cross-section, taken in a plane perpendicular to the moulding direction, the transversal dimension may be the maximum dimension of the non-circular cross-section, taken on a plane positioned transversally, in particular perpendicularly, to the moulding direction.

In the example shown, the smaller value T1 is the transversal dimension of the intermediate zone 42, whilst the larger value T2 is the transversal dimension of the forming cavity 34 immediately below the annular moulding surface 36. However, depending on the shape of the object 5, the smaller value T1 and the larger value T2 might also correspond to dimensions of the forming cavity 34 which are different to that assumed above.

In the example shown, the transition zone 53 is conformed as a funnel-shaped surface 43.

The funnel-shaped surface 43 extends about the moulding axis Y and has a transversal dimension, measured perpendicularly to the moulding axis Y, which decreases progressively moving towards the bottom 40 of the forming cavity 34.

The transition zone 53, or more specifically the funnel-shaped surface 43, is intended to shape the outside of the transition region 13 of the object 5.

Figure 10:
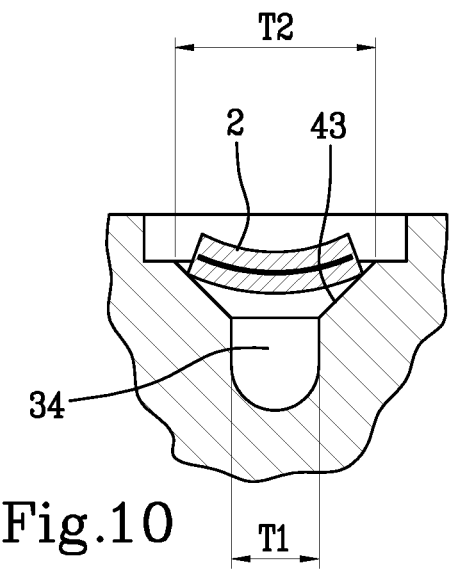
FIG. 10 is a schematic cross-section of a forming cavity on which a dose of polymeric material has been positioned.

As shown schematically in FIG. 10, the funnel-shaped surface 43 may have a transversal dimension which decreases in a linear manner from the larger value T2 to the smaller value T1 moving towards the bottom 40. In this case, the funnel-shaped surface 43 is shaped like an overturned truncated cone.

Figure 12:
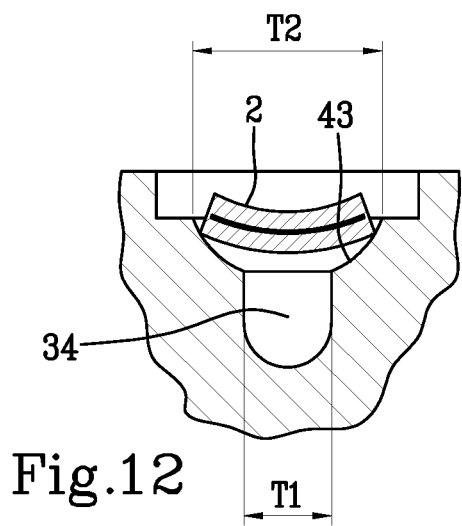
FIG. 12 is a schematic cross-section like that of FIG. 10 showing a forming cavity according to an alternative embodiment.
Figure 13:
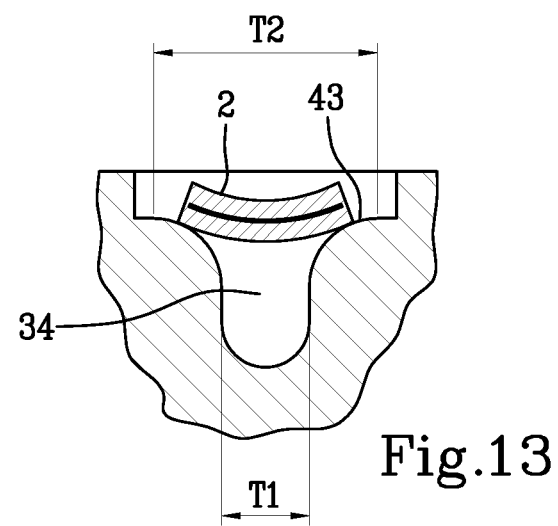
FIG. 13 is a schematic cross-section like that of FIG. 10 showing a forming cavity according to another alternative embodiment.

In the embodiments shown schematically in FIGS. 12 and 13, the funnel-shaped surface 43 has a transversal dimension which decreases in a non-linear manner moving towards the bottom 40.

More specifically, in the example of FIG. 12, the funnel-shaped surface 43 is concave, with a concavity facing towards the male mould part 28.

In the example of FIG. 13, the funnel-shaped surface 43 is convex, with a convexity facing towards the male mould part 28.

It is also possible to adopt other shapes for the funnel-shaped surface 43, for example a combination of concave and/or convex and/or frustum-conical shapes.

In these examples, the transition zone 53 has a transversal dimension which decreases without steps, that is to say, without discontinuity, from the larger value T2 to the smaller value T1, moving towards the bottom 40 of the forming cavity 34.

Figure 14:
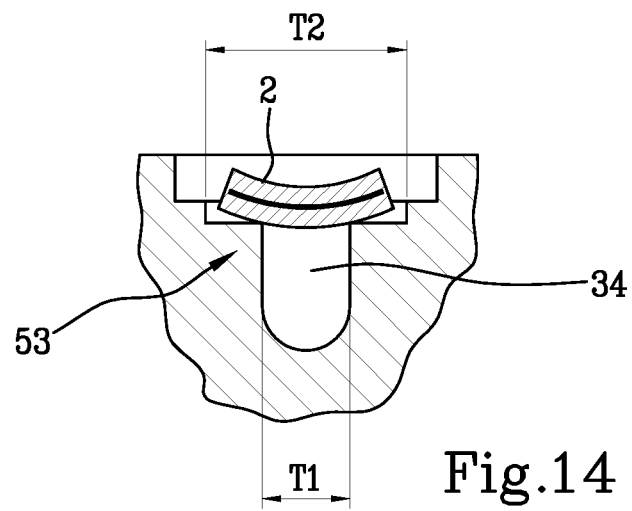
FIG. 14 is a schematic cross-section like that of FIG. 10 showing a forming cavity according to a further alternative embodiment, which is not covered by the current claims.

However, this condition is not necessary. In an alternative embodiment, shown in FIG. 14, the transition zone 53 may have a transversal dimension which passes from the larger value T2 to the smaller value T1 in a discontinuous manner. In this case, in the transition zone 53 there is a step 54, delimited by an upper surface on which the dose 2 (or, more generally, the pre-processed element) rests when it is introduced into the mould 21.

It should be noted that the terms "larger value" and "smaller value" are to be construed in a relative sense, that is to say, in the sense that the transversal dimension T2 is greater than the transversal dimension T1. This does not mean that the larger value T2 is the maximum value of the transversal dimension of the forming cavity 34, or that the smaller value than T1 is the minimum value of the transversal dimension of the forming cavity 34.

Figure 11:
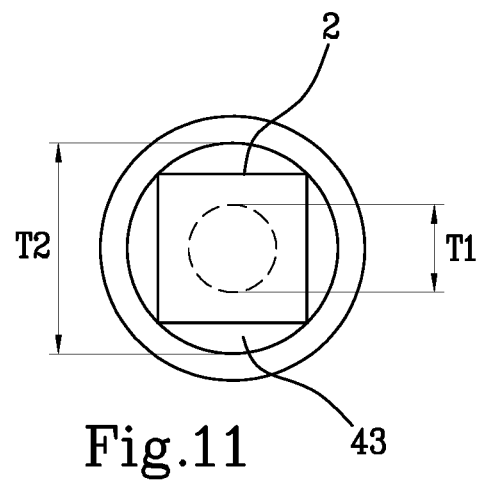
FIG. 11 is a top view of the forming cavity of FIG. 10.

The cross section of the funnel-shaped surface 43, or, more generally, of the transition zone 53, taken on a plane perpendicular to the moulding axis Y, may be circular, as shown in the example illustrated (see in particular FIG. 11), but also non-circular, in particular elliptic or polygonal, depending on the shape of the object 5 to be obtained.

In the example illustrated, an intermediate zone 42 is interposed between the transition zone 53 and the bottom 40 of the forming cavity 34, the intermediate zone 42 being intended to shape the outside of the intermediate region 12 of the object 5. The intermediate zone 42 may be delimited by a cylindrical surface, in particular having a constant diameter along the moulding axis Y.

However, this condition is not necessary and other geometries are also possible, depending on the shape of the object 5 to be obtained.

The funnel-shaped section 43, or, more generally, the transition zone 53, can be arranged immediately below the annular forming surface 36.

The female mould part 28 further comprises a cooling circuit 46, shown schematically in FIG. 2 and surrounding the forming cavity 34, for cooling and/or thermally conditioning the object 5, in particular its outer surface, whilst the object 5 is formed and remains inside the mould 21.

The male mould part 29 comprises a cooling circuit (not illustrated), for thermally conditioning the punch 30 and, therefore, cooling the object 5 from the inside.

In a lower portion of the forming cavity 34, particularly on the bottom 40, an air discharging device 47 is provided, which can be activated for removing the air present in the forming cavity 34 under the dose 2, during an initial step in which the dose 2 starts to be deformed by the punch 30.

The air discharging device 47 is conformed like a sort of the valve.

The air discharging device 47 may be positioned in a central zone of the bottom 40, for example in a position which is centred relative to the moulding axis Y.

Figure 5:
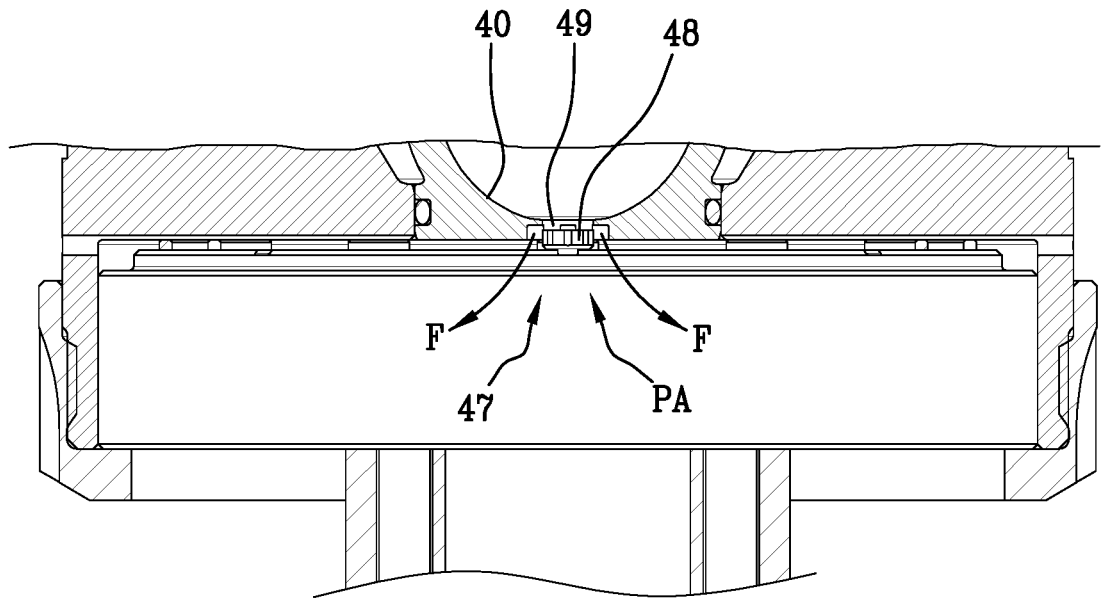
FIG. 5 shows, in an enlarged scale, a detail of FIG. 4, showing a bottom region of a female mould part provided with an air discharging device in an open position.
Figure 6:
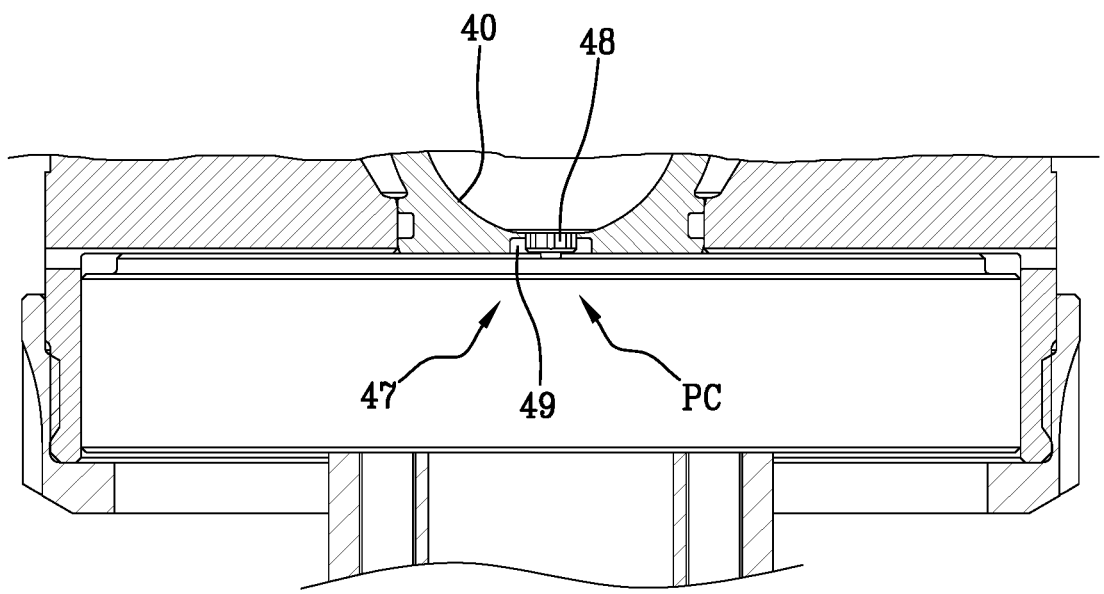
FIG. 6 is an enlarged and interrupted view like that of FIG. 5, showing the air discharging device in a closed position.

The air discharging device 47 comprises a shutter element 48, more clearly visible in FIGS. 5 and 6, housed in a seat 49 provided on the bottom 40. The seat 49 may be shaped like a through hole.

The shutter element 48 is movable between an open position PA, shown in FIG. 5, and a closed position PC, shown in FIG. 6. In the open position PA, the shutter element 48 opens a passage defined inside the seat 49, allowing the air present in the forming cavity 34 to flow towards the outside through the seat 49, as indicated by the arrows F in FIG. 5.

In the closed position PC, the shutter element 48 engages with the seat 49 in such a way as to close the latter. This prevents the escape of air from the forming cavity 34.

The shutter element 48 can be movable from the closed position PC to the open position PA owing to a driving device, not shown, for example of a mechanical, pneumatic, spring or other type.

Figure 7:
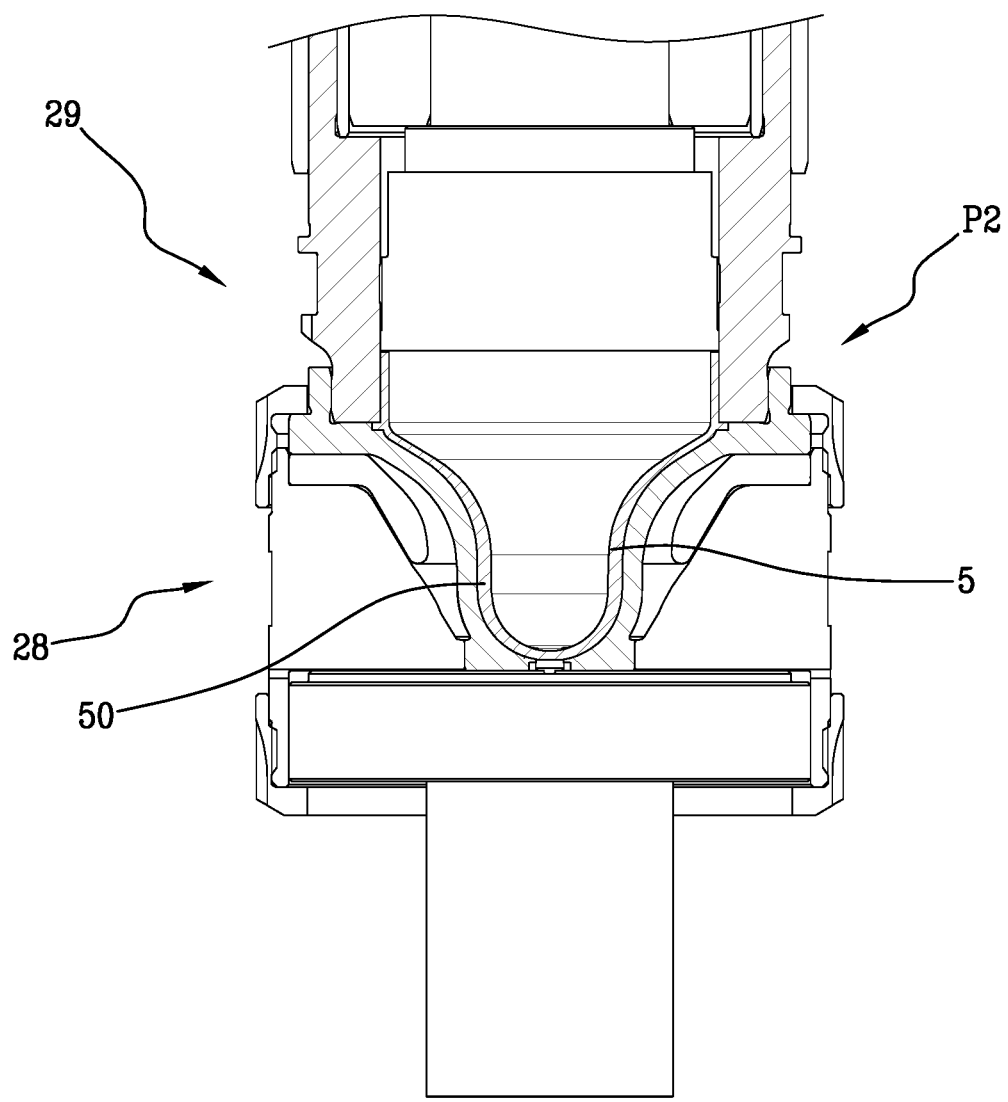
FIG. 7 is a view like that of FIG. 2, showing the mould in a forming configuration.

A movement system is associated with each mould 21 to mutually move the male mould part 29 and the female mould part 28 along the moulding direction between a maximum opening configuration P1, shown in FIG. 2, and a forming configuration P2, shown in FIG. 7.

In the maximum open configuration P1, the male mould part 29 and the female mould part 28 are spaced from each other and are positioned at the maximum distance from each other. In the maximum open configuration P1, it is possible to introduce between the female mould part 28 and the male mould part 29 a dose 2 released by a transport element 23. This may occur by interposing the transport element 23 between the female mould part 28 and the male mould part 29, in particular by positioning the transport element 23 above the female mould part 28, with the dose 2 adherent to the transport surface 25 and facing the forming cavity 34.

In the forming configuration P2, a forming chamber 50 is defined between the female mould part 28 and the male mould part 29. The forming chamber 50 is shown in FIG. 7. In the forming configuration P2, the forming chamber 50 has a shape substantially corresponding to the object 5.

The movement system which allows each mould 21 to pass from the maximum open configuration P1 to the forming configuration P2, or vice versa, may be active on the female mould part 28, on the male mould part 29, or on both.

In the example shown, the movement system is active on the female mould part 28, which is movable along the moulding axis Y in such a way as to move towards, or alternatively move away from, the male mould part 29.

The movement system may be of the hydraulic, mechanical or other type. In the example shown, the movement system comprises an actuator, particularly of the hydraulic type, to which is connected a stem 51. The female mould part 28 is fixed relative to the stem 51. The actuator moves the stem 51 along the moulding axis Y, so that the female mould part 28 can be moved between a position of maximum distance from the male mould part 29 (in the maximum opening configuration P1 of the mould 21) or alternatively a position of minimum distance from the male mould part 29 (in the forming configuration P2 of the mould 21).

During operation, a continuous structure, comprising, for example, a plurality of layers of polymeric material, is dispensed by the dispensing device 20 and comes out from the outlet opening of the latter along the outlet direction E, as shown in FIG. 1. The layers which form the continuous structure lie in respective planes parallel to each other and to the outlet direction E.

The central body of the transport device 22 rotates, for example continuously, about the axis Z. The transport elements 23 supported by the central body thus move along a closed path, which, in the example shown, is shaped like a circle centred on the axis Z. This is the first movement of the transport elements 23.

The path of the transport elements 23 passes beneath the outlet opening of the dispensing device 20 in a dispensing zone in which the doses 2 are dispensed.

Upstream of the dispensing zone, each transport element 23 rotates about the corresponding axis H, so as to be in the picking up configuration P, when the transport element 23 is below the outlet opening of the dispensing device 20. In this configuration, the transport element 23 picks up a dose 2 severed from the continuous structure coming out from the dispensing device 20, owing to the separating element 27. The latter cuts the dose 2, in particular immediately below the outlet opening. The dose 2 rests on the transport surface 25, which is positioned parallel, or almost, to a surface of the dose 2 facing it.

In the picking up configuration P, the transport surface 25 is further arranged parallel, or almost, to the central layer 3 of the dose 2.

The dose 2 is picked up by the transport element 23 whilst the dose 2 has a first orientation, which, in the example shown is substantially vertical. The dose 2 adheres to the transport surface 25 without undergoing significant deformations. The central layer 3 also remains substantially un-deformed.

The transport element 23 now moves away from the dispensing device 20 carrying with it the dose 2, which remains adherent to the transport surface 25 owing to its viscosity and, if necessary, owing to the suction device of the transport element 23, which holds the dose in contact with the transport surface 25.

Simultaneously, the transport element 23 rotates about the respective axis H, thereby modifying the orientation of the dose 2 until moving the dose 2 to a second orientation in the release configuration R. This is the second movement of the transport element 23. In the release configuration R, the transport surface 25 of the transport element 23 is facing downwards and is in particular oriented horizontally, like the dose 2 adhering to it.

When passing from the picking up configuration P to the release configuration R, the dose 2 is thus turned from the first orientation to the second orientation. During its path about the axis Z, the transport element 23 becomes arranged between the female mould part 28 and the male mould part 29, thereby overlapping to the female mould part 28. This overlapping may occur at a point of the path of the transport element 23 or in a more extended stretch of the path of the transport element 23 and of the mould 21, if the latter is also movable along a respective path.

When the transport element 23 is above the female mould part 28, the transport element 23 is in the release configuration R and is furthermore interposed between the female mould part 28 and the male mould part 29, which are in the maximum opening configuration P1.

The transport element 23 now releases the dose 2 which it is transporting. The dose 2 is deposited in the female mould part 28, in particular inside the forming cavity 34 facing upwards. This may occur with the help of the blowing device or a mechanical element, which act on the dose 2 so as to detach it from the transport surface 25.

As shown in FIG. 2, the dose 2, after being released by the transport element 23, falls into the forming cavity 34, resting on the transition zone 53 which, in the example shown, is provided in an upper portion of the forming cavity 34.

The dimensions of the dose 2 transversely to the moulding axis Y, in particular the length of the dose 2 (measured along the outlet direction E) and its width (corresponding to the width of the outlet opening of the dispensing device 20) are greater than the transversal dimensions of the forming cavity 34, at least in a portion of the forming cavity 34. Consequently, the dose 2 does not fall until reaching the bottom 40 of the forming cavity 34.

On the other hand, since the dimensions of the dose 2, transversely to the moulding axis Y, are greater than the transversal dimensions of at least one lower portion of the passage section defined by the transition zone 53, the dose 2 rests on the transition zone 53 and remains spaced from the bottom 40.

This guarantees that the dose 2 remains extended whilst it is resting on the transition zone 53, in particular on the funnel-shaped surface 43. This avoids, in particular, undesired wrinkling of the dose 2.

The funnel-shaped surface 43 also makes it possible to better centre the dose 2 in the forming cavity 34, thereby preventing the dose from adhering to the inner surface which delimits the forming cavity 34 only on one side of the latter relative to the moulding axis Y.

It should be noted that the dose 2 is only resting on the transition zone 53, in particular on the funnel-shaped surface 43, without there being constraints which retain it peripherally.

After the dose 2 has been placed inside the forming cavity 34, the female mould part 28 and the male mould part 29 start to move towards each other. In the example illustrated, this is performed by moving the female mould part 28 towards the male mould part 29 along the moulding direction.

Figure 3:
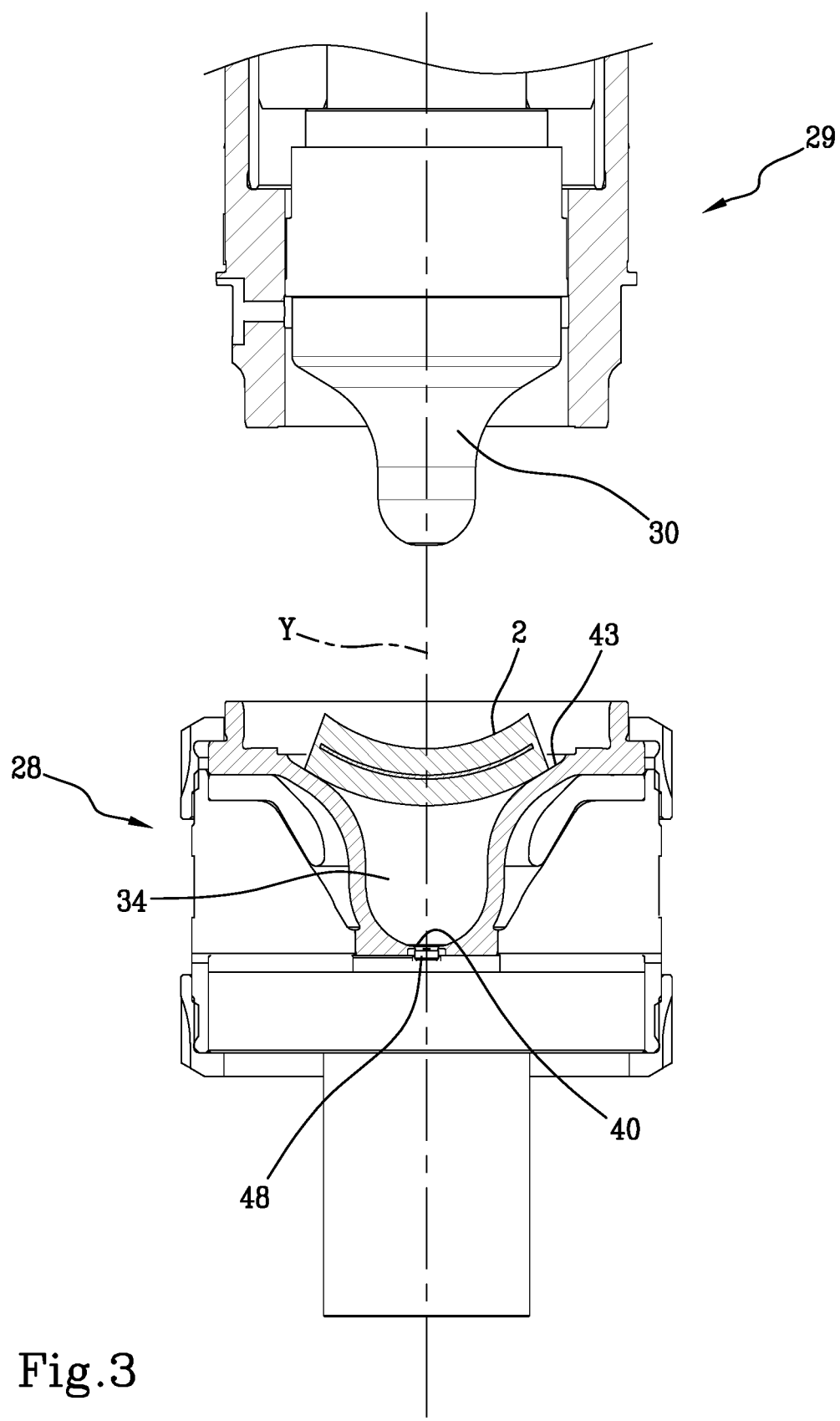
FIG. 3 is a view like that of FIG. 2, showing the mould, still open, in a step subsequent to that of FIG. 2.

Whilst this occurs, the dose 2 rests on the transition zone 53, in particular on the funnel-shaped surface 43, without interacting with the punch 30. More in detail, only a peripheral region of the dose 2 is resting on the transition zone 53, whilst a central region of the dose 2 is free of supports, that is to say, it faces the bottom 40 of the forming cavity 34, but is at a certain distance from the bottom 40. Due to the force of gravity and the fact that the dose 2 is in this step in a still fluid state, at a relatively high temperature, the dose 2 may be deformed, flowing downwards in its central region. Consequently, as shown in FIG. 3, the dose 2 may adopt a slightly concave shape, with a concavity facing upwards, that is to say, towards the male mould part 29.

In this way, the dose 2 undergoes a sort of pre-forming, that is to say, it deforms before interacting with the male mould part 29. This feature is not to be considered as a negative effect, since it gives the dose 2 a preliminary concave shape which will be subsequently increased when the dose 2 interacts with the punch 30 to achieve the final shape of the object 5.

The female mould part 28 and the male mould part 29 continue to move towards each other. During this movement, at a certain point the dose 2 comes into contact with the punch 30, which starts to deform the dose 2 rendering it increasingly concave and pushing it towards the bottom 40 of the forming cavity 34. When the punch 30 starts to interact with the dose 2, the latter is still spaced from the bottom 40.

Figure 4:
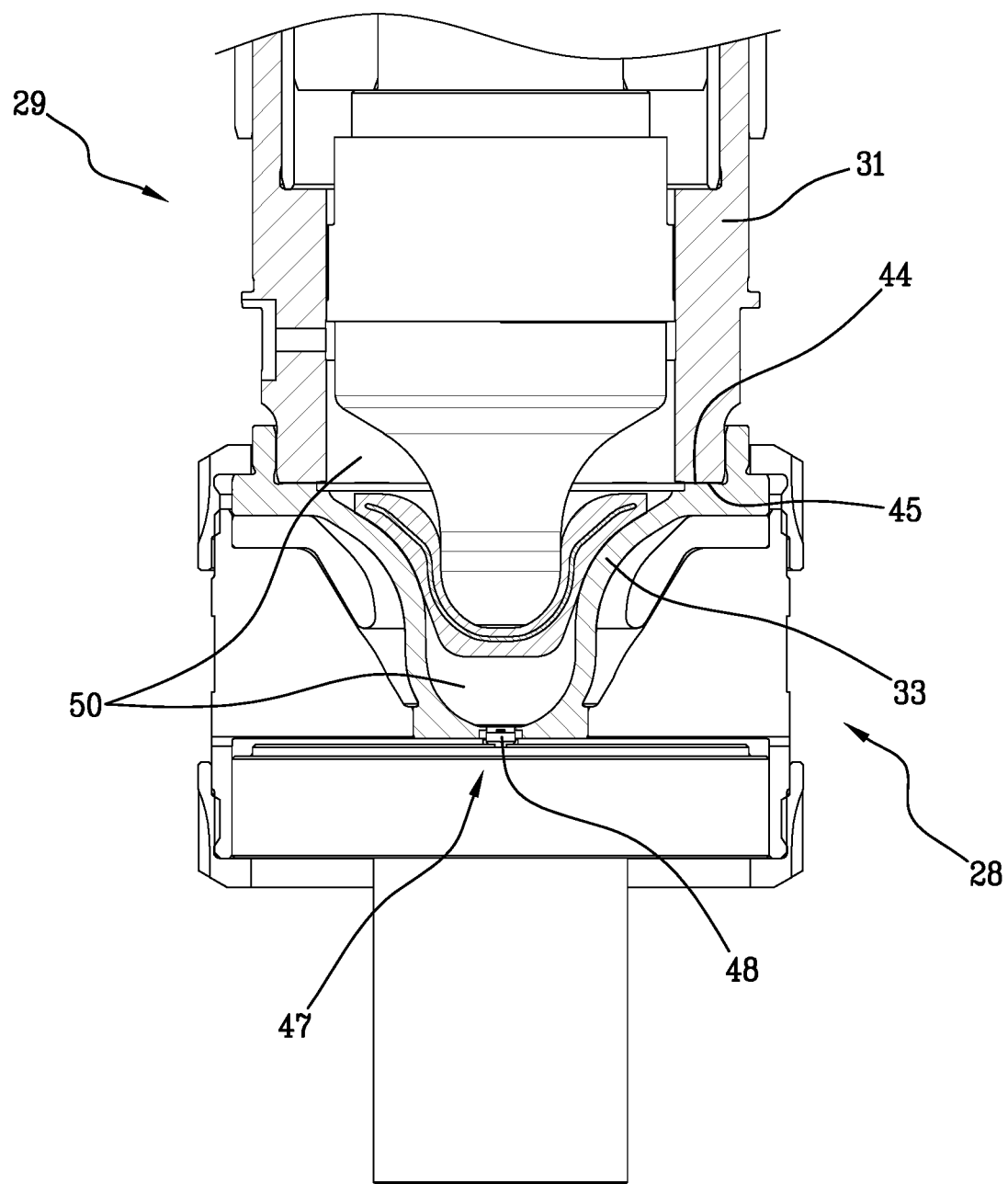
FIG. 4 is a view like that of FIG. 2, showing the mould in a step subsequent to that of FIG. 3, in which a forming chamber of the mould is closed.

Whilst the female mould part 28 and the male mould part 29 continue to move towards each other, at a certain point, as shown in FIG. 4, the female mould part 28 comes into contact with the male mould part 29. More specifically, the abutment surface 44 of the female mould element 33 abuts against the contact surface 45 of the extractor element 31.

When this occurs, between the male mould part 29 and the female mould part 28 the forming chamber 50 is defined, which has not yet the shape of the object 5, since it encloses a volume greater than the volume of the object 5. However, the forming chamber 50 is now closed, so as to prevent escape of portions of the dose 2, which is deformed between the female mould part 28 and the male mould part 29.

In fact, the dose 2 is initially positioned in an upper portion of the forming cavity 34, close to an upper edge of the latter. There is thus the risk that, when the dose is deformed by interacting with the punch 30, some portions of the dose 2 can protrude outside the edge of the forming cavity 34, if the latter is open. This risk is avoided by closing the forming cavity 34 to define a closed forming chamber 50.

The forming chamber 50 is defined between the punch 30, the extractor element 31 and the forming cavity 34.

The forming chamber 50 is closed when the dose 2 is not yet in contact with the bottom 40 of the forming cavity 34.

During this step, the punch 30 has already started to deform the dose 2. More specifically, the dose 2 rests again, in its peripheral region, on the transition zone 53, in particular on the funnel-shaped surface 43. In a central region thereof, the dose 2 has started to be stretched towards the bottom 40 by the punch 30, which is penetrating inside the forming cavity 34.

Subsequently, the female mould part 28 and the male mould part 29 continue to move towards each other. Whilst this occurs, the relative position of the female mould element 33 and the extractor element 31 does not change, since the abutment surface 44 of the female mould element 33 is in contact with the contact surface 45 of the extractor element 31. However, the punch 30, pushed by the female mould part 28, withdraws progressively inside the extractor element 31, while compressing one or more springs which tend to push the punch 30 downwards, outside the extractor element 31. Whilst this occurs, the volume of the forming chamber 50 gradually reduces.

Whilst the punch 30 penetrates inside the forming cavity 34, the dose 2 is deformed without breaking the central layer 3, in such a way that it is positioned on the inside of the lateral wall 11 of the object 5 without substantial interruptions. This is made possible by the fact that the dose 2 is released into the forming cavity 34 in such a way that the dose 2 rests on the transition zone 53 with the central layer 3 lying on a plane transversal, in particular perpendicular, to the moulding axis Y. When the punch 30 penetrates in the forming cavity 34, the dose 2 is stretched and its layers are thinned, without, however, the central layer 3 undergoing significant breakages.

By continuing to move the female mould part 28 and the male mould part 29 towards each other, the forming position P2 shown in FIG. 7 is reached, in which the polymeric material forming the dose 2 has filled the entire moulding chamber 50, the shape of which corresponds to that of the object 5.

As shown in FIGS. 2 to 4 and, in an enlarged scale, in FIG. 5, when the dose 2 is positioned on the transition zone 53, the shutter element 48 of the discharging device 47 is in the open position PA. The air present in the forming chamber 34, beneath the dose 2, can in this way be discharged, flowing out of the forming cavity 34 through the passage defined in the seat 49.

This helps to obtain good quality objects 5 because the dose 2, resting on the funnel-shaped surface 43 or, more generally, on the transition zone 53, obstructs the upwards flow of the air, present in the forming cavity 34 beneath the dose 2. In this condition, discharging the air trapped in the forming cavity 34 beneath the dose 2 by causing the air to flow upwards could be difficult.

As shown in FIG. 7, in the forming configuration P2, the shutter element 48 of the discharging device 47 is in the closed position PC shown enlarged in FIG. 6, so as to prevent damaging the outer surface of the bottom wall 10 of the object 5.

The shutter element 48 may be moved to the closed position PC before reaching the forming configuration P2.

The mould 21 remains in the forming configuration P2 for a sufficient time to stabilise the shape of the object 5, so that the latter can be extracted from the mould 21 without undergoing damage.

At this point, the female mould part 28 and the male mould part 29 move away from each other, in particular moving the female mould part 28 downwards. The object 5 thus detaches from the forming cavity 34 and remains associated with the punch 30.

While the female mould part 28 moves away from the male mould part 29, the extractor element 31 is pushed towards the female mould part 28 owing to the system of springs previously compressed by interaction with the female mould part 28. In this way the extractor element 31, which engages with the annular protrusion 9, detaches the object 5 from the punch 30, as shown in FIG. 8.

The object 5 may now be collected by a removal device, not illustrated, to be moved away from the mould 21.

In this case, the object 5 can be transported towards a storage place, or towards an operating station or a machine where the object 5 is subjected to further operations.

More specifically, if the object 5 is a preform, it is possible to transport the object 5 to a storage place and, after a certain period, subject the object 5 to blow moulding or to stretch blow moulding to obtain from it the container, on a machine different to that to which the mould 21 belongs.

Alternatively, if the object 5 is a preform, it is possible to obtain the container from it by a blow moulding or stretch blow moulding operation carried out on the same machine to which the mould 21 belongs. This may occur by keeping the object 5 engaged with a specially designed punch 30, and by replacing the female mould part 28 with a female part of a blow moulding mould, in which the object 5 can be subjected to blow moulding or stretch blow moulding.

This alternative makes it possible to freely design the object 5, and in particular the transition region 13 of the object 5 which determines how the transition zone 53 of the forming cavity 34 will be shaped, thereby optimising the shape of the transition zone 53 so that the latter can correctly support the dose 2.

Figure 9:
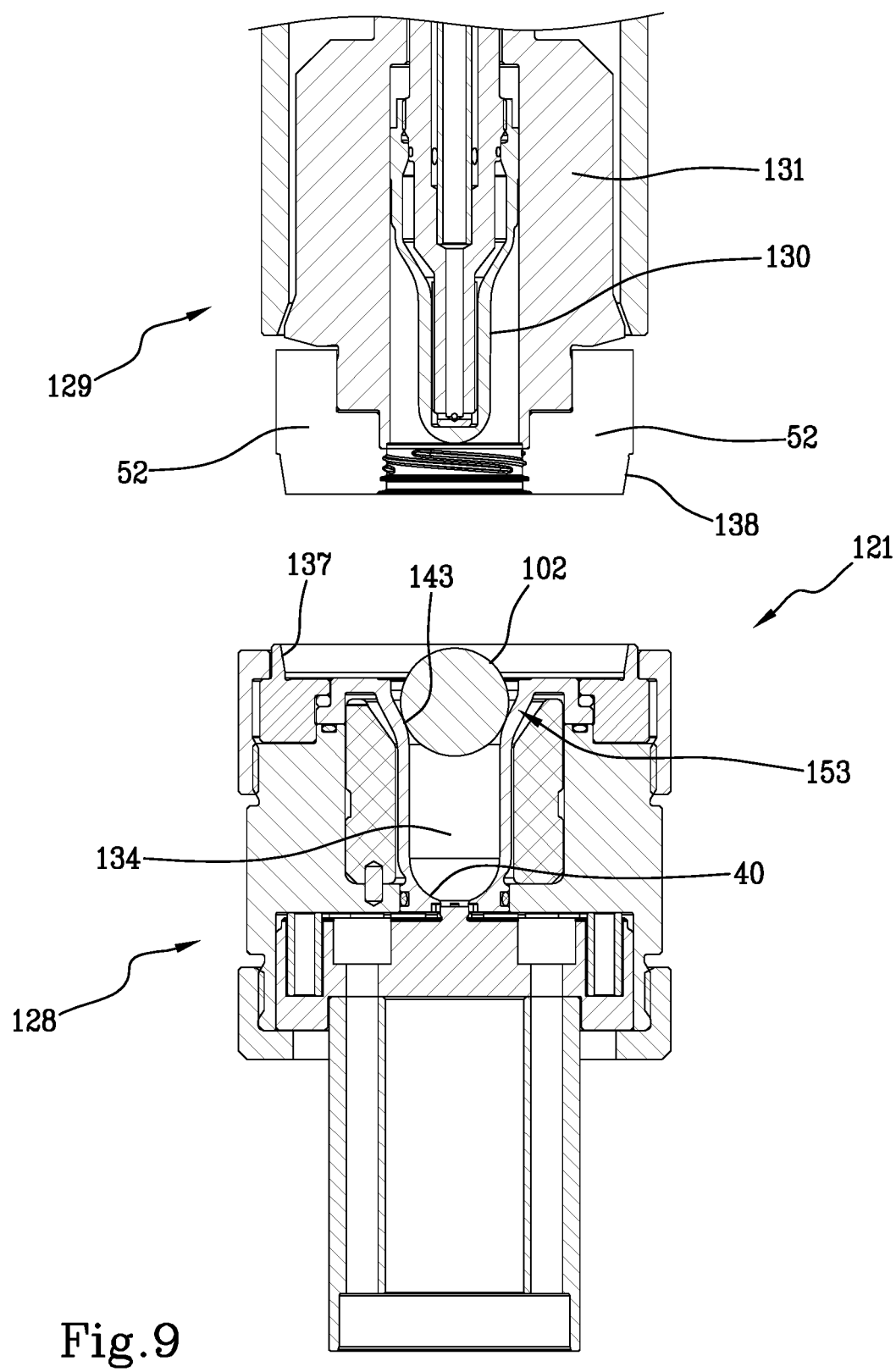
FIG. 9 is a view like that of FIG. 2, showing a mould according to an alternative embodiment.

FIG. 9 shows a mould 121 according to an alternative embodiment, which may be included in an apparatus of the type shown in FIG. 1.

The mould 121 differs from the mould 21 described above mainly because the mould 121 is intended to form an object 5 by compression moulding, starting from a dose 102 which, instead of being shaped like a parallelepiped, has a substantially spherical shape.

In the case illustrated, the dose 102 is made with a single polymeric material, even though this condition is not necessary.

The mould 121 is configured for producing an object 5 shaped like a preform for a container. The preform which can be obtained from the mould 121 can in particular be used to obtain, by blow moulding or stretch blow moulding, a bottle having a threaded neck.

For this purpose, the mould 121 comprises a female mould part 128, similar to the female mould part 28 described with reference to Figures from 1 to 8, and in particular having a forming cavity 134 delimited, in an upper portion thereof, by a funnel-shaped surface 143 which defines a transition zone 153. The female mould part 128 is intended to shape the outside of a body of the preform which can be obtained from the dose 102. The body of the preform will be deformed during the subsequent blow moulding or stretch blow moulding in such a way as to form a body of the bottle.

A male mould part 129 is further provided, the male mould part 129 comprising a punch 130 intended to enter in the forming cavity 134 for shaping the inside of the object 5. The male mould part 129 further comprises a sleeve 131 which surrounds the punch 130 and which may help to separate the object 5 from the punch 130, after the object 5 has been formed.

The mould 121 further comprises at least two inserts 52, movable between a contact position shown in FIG. 9 and a spaced position, not illustrated. Each insert 52 has a forming surface suitable for shaping the outside of a portion of the neck of the object 5, particularly a threaded neck portion. In the contact position shown in FIG. 9, the inserts 52 are in contact with each other so that the respective forming surfaces can shape the outside of the neck of the object 5. In the spaced position, the inserts 52 are spaced from each other so that the object 5 can be extracted from the mould 121.

In the example shown, the inserts 52 are supported by the male mould part 129, even if this condition is not necessary.

The female mould part 128 has a centring surface 137, arranged above the transition zone 153 and spaced from the transition zone 153.

The centring surface 137 is suitable for engaging, in a shapingly coupled manner, with a further centring surface 138 that delimits a lower end of the inserts 52. More in general, the further centring surface 138 is associated with the male mould part 129.

The centring surface 137 engages with the further centring surface 138 for allowing the female mould part 128 to be positioned in a centred manner relative to the male mould part 129.

As shown in FIG. 9, when the dose 102 is released in the forming cavity 134, the dose 102 rests in the transition zone 153, which in this case is defined by a funnel-shaped surface 143, and remains spaced from the bottom 40 of the forming cavity 134.

The transition zone 153 makes it possible to centre the dose 102, which, as already mentioned, is in this case substantially spherical, in the forming cavity 134, thereby improving the positioning of the dose 102 inside the female mould part 128. Moreover, the time for positioning the dose in the forming cavity 134 is reduced, because it is sufficient to rest the dose 102 on the transition zone 153, without waiting for the dose 102 to reach the bottom 40.

The dose will come into contact with the bottom 40 in a subsequent step, whilst it will be deformed by the punch 130.

After having been positioned on the funnel-shaped surface 143, the dose 102 is subjected to compression moulding in a manner similar to that described above with reference to FIGS. 3 to 8.

It is stressed that, when the dose 2, 102 rests on the funnel-shaped surface 43, 143, the dose 2, 102 is at least partially surrounded by the centring surface 37, 137. More precisely, the centring surface 37, 137 faces at least one portion of the dose 2, 102 in a direction parallel to the moulding axis. In the examples shown, the dose 2, 102 does not protrude above the centring surface 37, 137. The centring surface 37, 137 is furthermore spaced from the dose 2, 102. The centring surface 37, 137 defines a containment surface which delimits the dose 2, 102 at the sides thereof, even if, due to an inconvenience occurred while the dose 2, 102 was transported, the dose 2, 102 is not positioned in a centred manner relative to the transition zone 53, 153.

Reference has been made in the above description to transport elements provided with two movements, that is to say, a first movement along a closed path about the axis Z and a second movement about the axis H for modifying the orientation of the dose, in particular by overturning the dose from a first substantially vertical orientation to a second substantially horizontal orientation.

It is however possible to also use, in combination with the moulds described above, transport elements of a different kind, for example transport elements that are not provided with the second movement for modifying the orientation of the dose, but only a movement along a closed path to move the dose from the dispensing device to the mould.

The invention claimed is:

1. A method comprising the following steps:
providing a pre-processed element made of at least one polymeric material,
introducing the pre-processed element in a female mould part having a forming cavity,
shaping the pre-processed element between the female mould part and a male mould part, the female mould part and the male mould part being movable relative to one another along a moulding direction so as to form a concave object from the pre-processed element,
wherein the forming cavity has a transversal dimension measured transversely to the moulding direction, the forming cavity further having a transition zone defined by a funnel-shaped surface in which the transversal dimension progressively decreases from a larger value to a smaller value, the forming cavity further having a bottom,
and wherein, during the introducing step, the pre-processed element is placed in the forming cavity on the transition zone, so that the pre-processed element rests on the funnel-shaped surface at a distance from the bottom of the forming cavity, wherein the pre-processed element is a dose of polymeric material in a molten state, the dose being severed from a plasticizing device.

2. The method according to claim 1, wherein the funnel-shaped surface has a frustum-conical shape.

3. The method according to claim 1, wherein the funnel-shaped surface has a concave shape, with a concavity facing the male mould part, or a convex shape, with a convexity facing the male mould part.

4. The method according to claim 1, wherein the forming cavity has an intermediate zone interposed between the bottom and the transition zone, the intermediate zone having an internal dimension measured perpendicularly to the moulding direction.

5. The method according to claim 4, wherein the pre-processed element has a dimension, measured transversely to the moulding direction, which is greater than a transversal dimension of the intermediate zone.

6. The method according to claim 1, wherein the pre-processed element is located on the transition zone by resting the pre-processed element on the transition zone along an entire peripheral edge of the pre-processed element.

7. The method according to claim 1, wherein the pre-processed element has a substantially flat shape and is located on the transition zone whilst the pre-processed element lies on a plane arranged perpendicularly to the moulding direction.

8. The method according to claim 7, wherein the pre-processed element has a multilayer structure and comprises a functional layer which lies on a plane arranged perpendicularly to the moulding direction, when the pre-processed element is located on the transition zone.

9. The method according to claim 1, wherein the object is formed in a forming chamber defined between the female mould part and the male mould part, wherein the forming chamber is closed after the pre-processed element has been located on the transition zone, at a moment in which the forming chamber has a volume which is greater than volume of the object, the volume of the forming chamber being progressively reduced while the female mould part and the male mould part move towards each other, and wherein the forming chamber is closed before the pre-processed element contacts the bottom.

10. The method according to claim 1, wherein the pre-processed element, after being located on the transition zone and before starting to interact with the male mould part, is deformed at least in a central zone thereof due to force of gravity, thereby taking a concave shape with a concavity facing upwards.

11. The method according to claim 1, wherein during the step of shaping the pre-processed element, there is provided discharging air from a zone of the forming cavity positioned below the pre-processed element.

12. The method according to claim 1, wherein, while the dose is transported from the plasticizing device towards the forming cavity, the dose is turned from a first substantially vertical orientation which the dose has at an outlet of the plasticizing device, to a second substantially horizontal orientation with which the dose rests on the transition zone.

13. The method according to claim 1, wherein the object is a preform intended to be subjected to blow moulding or stretch blow moulding in order to obtain a container.

14. The method according to claim 1, wherein the pre-processed element is brought into contact with the bottom owing to interaction with the male mould part.

15. The method according to claim 1, wherein the female mould part has, in an upper region thereof, a centring surface suitable for shapingly engaging with a further centring surface associated with the male mould part, the centring surface protruding from the forming cavity towards the male mould part and surrounding at least partially the pre-processed element in a position spaced from a side surface of the pre-processed element, when the pre-processed element rests on the transition zone.

16. An apparatus comprising:
    a feeding device for providing a pre-processed element made of at least one polymeric material, the pre-processed element being a dose of the polymeric material in a molten state;
    at least one mould comprising a female mould part and a male mould part, the female mould part and the male mould part being movable relative to one another in a moulding direction in order to form a concave object from the pre-processed element, the female mould part having a forming cavity;
    a transport device for transporting the pre-processed element towards the mould and releasing the pre-processed element into the forming cavity;
    wherein the forming cavity has a bottom and a lateral region, the lateral region having a transition zone defined by a funnel-shaped surface in which a transversal dimension of the forming cavity progressively passes from a larger value to a smaller value, the transition zone being at a distance from the bottom and being configured to restingly receive the pre-processed element when the pre-processed element is released in the forming cavity by the transport device,
    wherein the feeding device comprises a plasticizing device for plasticizing the least one polymeric material, the apparatus comprising at least one separating element for severing the dose of polymeric material in the molten state from the plasticizing device.

17. The apparatus according to claim 16, and further comprising an air discharging device positioned in a lower portion of the forming cavity and operable for removing air from a region of the forming cavity positioned below the pre-processed element, before the pre-processed element contacts the bottom.

18. The method according to claim 4, wherein the internal dimension of the intermediate zone is constant.

19. A method comprising the following steps:
    providing a pre-processed element made of at least one polymeric material,
    introducing the pre-processed element in a female mould part having a forming cavity,
    shaping the pre-processed element between the female mould part and a male mould part, the female mould part and the male mould part being movable relative to one another along a moulding direction so as to form a concave object from the pre-processed element,
    wherein the forming cavity has a transversal dimension measured transversely to the moulding direction, the forming cavity further having a transition zone defined by a funnel-shaped surface in which the transversal dimension progressively decreases from a larger value to a smaller value, the forming cavity further having a bottom,
    and wherein, during the introducing step, the pre-processed element is placed in the forming cavity on the transition zone, so that the pre-processed element rests on the funnel-shaped surface at a distance from the bottom of the forming cavity,
    and wherein the pre-processed element, after being located on the transition zone and before starting to interact with the male mould part, is deformed at least in a central zone thereof due to force of gravity, thereby taking a concave shape with a concavity facing upwards.

\* \* \* \* \*